(12) United States Patent
Fujikawa et al.

(10) Patent No.: US 6,403,959 B1
(45) Date of Patent: Jun. 11, 2002

(54) INFRARED DETECTOR ELEMENT, AND INFRARED SENSOR UNIT AND INFRARED DETECTING DEVICE USING IT

(75) Inventors: Kazuhiko Fujikawa, Kyoto; Takeshi Masutani, Osaka; Tsutomu Nakanishi, Osaka; Shinji Umeda, Osaka; Kazuki Komaki, Osaka; Katsumasa Miki, Osaka; Koji Nomura, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/402,969

(22) PCT Filed: Feb. 12, 1999

(86) PCT No.: PCT/JP99/00615

§ 371 (c)(1),
(2), (4) Date: Nov. 22, 1999

(87) PCT Pub. No.: WO99/41575

PCT Pub. Date: Aug. 19, 1999

(30) Foreign Application Priority Data

Feb. 13, 1998 (JP) ............................. 10-030964
Feb. 13, 1998 (JP) ............................. 10-030965

(51) Int. Cl.$^7$ ............................................ G01J 1/02
(52) U.S. Cl. ............................. 250/338.3; 250/338.4
(58) Field of Search ....................... 250/338.3, 338.1, 250/338.4, 353

(56) References Cited

U.S. PATENT DOCUMENTS 5,523,564 A * 6/1996 Yamada et al. .......... 250/338.1
5,567,941 A * 10/1996 Fujikawa et al. ........ 250/338.3

FOREIGN PATENT DOCUMENTS

| JP | 59-12075 | 1/1984 |
| JP | 59-153133 | 9/1984 |
| JP | 2-201228 | 8/1990 |
| JP | 2-278131 | 11/1990 |
| JP | 4-158583 | 6/1992 |
| JP | 7-92027 | 4/1995 |
| JP | 8-145786 | 6/1996 |
| JP | 11-6761 | 1/1999 |

OTHER PUBLICATIONS

T. Kuritani et al. "Readout", Horiba, Ltd. No. 4, pp. 83–90 (Jan. 1992).

* cited by examiner

*Primary Examiner*—Georgia Epps
*Assistant Examiner*—Richard Hanig
(74) *Attorney, Agent, or Firm*—Ratner & Prestia (57) ABSTRACT

The present invention relates to an infrared detector element to detect infrared rays by means of a pyroelectric material, and an infrared sensor unit and an infrared detecting device using the infrared detector element and has an object of realizing an omnidirectional infrared detector element that can gain an output against an object to be detected moving in whatever directions. In order to accomplish this object, the present invention proposes a setup comprising a pair of first electrodes (12, 13), which have a function of absorbing infrared rays, are close to trapezoidal in shape, respectively, and are disposed on one of the surfaces of a pyroelectric material (11) with electrical connections made in such a way that the first electrodes are opposite to each other in polarity, and a pair of second electrodes (14, 15) disposed on the other surface of the pyroelectric material (11) and electrically connected with each other, in which the lower side of the close to trapezoidal shape of the first electrodes (12, 13) of one hand is aligned in the same direction as the lower side of the close to trapezoidal shape of the second electrodes (14, 15) of the other hand, thereby producing an effect of gaining an output against an object to be detected making a movement from whatever directions.

57 Claims, 10 Drawing Sheets

FIG. 1(a)

Y Direction
45° Direction
X Direction

Y Direction
45° Direction
X Direction

FIG. 11(b)

INFRARED DETECTOR ELEMENT, AND INFRARED SENSOR UNIT AND INFRARED DETECTING DEVICE USING IT

This application is a U.S. National Phase application of PCT International application PCT /JP99/00615.

FIELD OF THE INVENTION

The present invention relates to an infrared detector element for detecting infrared rays by means of a pyroelectric material, and an infrared sensor unit and an infrared detecting device using the infrared detector element.

BACKGROUND OF THE INVENTION

In recent years, a pyroelectric infrared sensor has been used in a microwave oven for measuring temperatures of foods to be cooked, in an air conditioner for controlling the room temperature, in an automatic door and a burglar alarm system for detecting people and the like utilizing the features of the pyroelectric infrared sensor to perform non-contact detection of the existence of an object and to carry out a non-contact measurement of temperatures, and its applications are considered to increase further from now on.

In general, an infrared sensor utilizes the pyroelectric effect of a pyroelectric element such as an $LiTaO_3$ crystal and the like and electrical charges always appear on the surface of the pyroelectric element due to its spontaneous polarization. Under a stabilized condition of the pyroelectric material in the atmosphere, these electrical charges are coupled with electrical charges in the atmosphere to maintain a neutralized state electrically. When infrared rays are incident on the pyroelectric element, its temperature changes, thereby causing the electrical charges on the surface of the pyroelectric element to lose and change the electrically neutralized state. At this time, the electrical charges appearing on the surface of the pyroelectric element are detected by the infrared sensor, thereby measuring the amount of incident infrared rays. An object is generally radiating infrared rays in accordance with its temperature and the existence and temperature of the object can be detected by the use of the infrared sensor.

Next, a description is given to an infrared detector element that serves as a technical background of the present invention with reference to drawings.

Figure 11A:
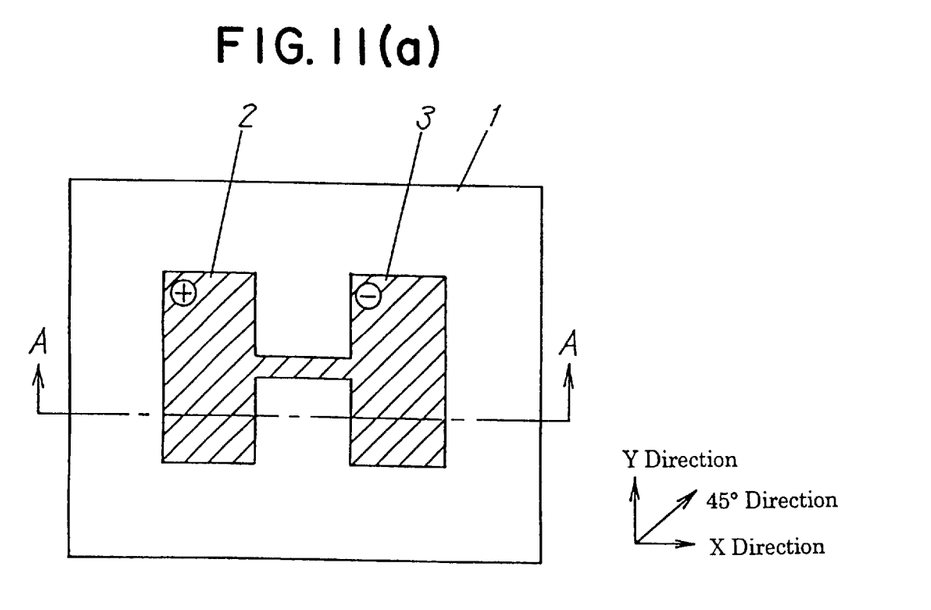
Figure 11B:
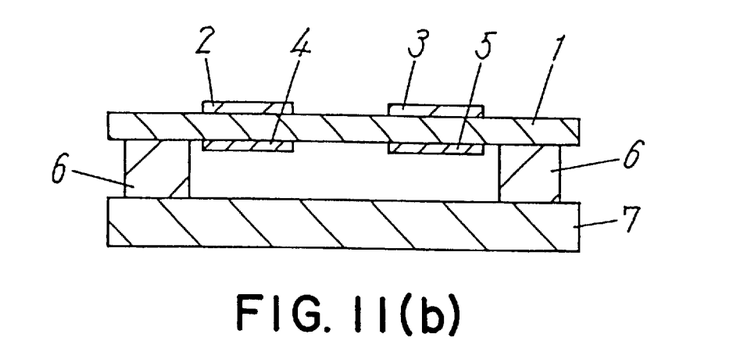

FIG. 11(a) is a plan view of an infrared detector element that describes the background technology of the present invention and FIG. 11(b) is a cross-sectional view of the infrared detector element of FIG. 1(a).

In the drawing, a pyroelectric element 1 has a pair of rectangular first electrodes 2 and 3, each of which performs the function of an infrared absorbing film, formed on the surface thereof with electrical connections made in such a way that the electrodes 2 and 3 are opposite in polarity and also has a pair of second electrodes 4 and 5 of the same rectangular shape as the first electrodes 2 and 3, formed on the bottom surface thereof.

These first electrodes 2 and 3 and second electrodes 4 and 5 constitute, respectively, an infrared detecting segment. These two of the second electrodes 4 and 5 are opposite in polarity and connected in series or in parallel with each other. The spacing between the second electrodes 4 and 5 is usually made the same as the spacing between the infrared ray incident electrodes or larger than 0.8 mm, thereby building a dual element type infrared detector element that does not incur such an adverse effect as crosstalk.

This infrared detector element is finished by connecting the pyroelectric element 1 to a wiring board 7 by means of a pyroelectric element support 6, while keeping the infrared detecting segment in a thermally insulated state.

When the infrared detector element as structured above is used, an optical system with a Fresnel lens and the like is employed, thereby projecting a plurality of configurations of the infrared detector element in a detection area to create a detecting domain. At this time, when an object to be detected such as people and the like, for example, moves in the direction crossing the infrared detecting segment (in the X direction), a "minus output" is generated immediately after a "plus output", thus gaining a maximum output extending from "peak to peak". On the other hand, when an object to be detected moves in parallel to the infrared detecting segment (in the Y direction), the "plus output" and "minus output" are generated simultaneously, thus ending up with gaining no output due to a canceling effect.

The Japanese Patent Unexamined Publication TOKKAIHEI-2-201228 discloses an infrared detector element with an infrared detecting segment shaped like a right triangle.

In this case, an output can be obtained in both X and Y directions but, when an object to be detected moves in a 45° direction, the "plus output" and "minus output" are generated simultaneously in the same way as experienced with the foregoing infrared detector element with a rectangular type infrared detecting segment, resulting in no output due to a canceling effect.

As described in the above, since an infrared detector element is used with home appliances such as a lighting fixture, an air conditioner and the like, the infrared detector element is required to be nondirectional against an object to be detected in whatever directions it may move.

The object of the present invention is to provide an omnidirectional infrared detector element that responds with an output against an object to be detected in whatever directions it may move.

DISCLOSURE OF THE INVENTION

In order to accomplish the object as described in the above, the present invention discloses a setup comprising:
  a pyroelectric material; and
  a pair of infrared detecting segments, which are close to trapezoidal in shape, respectively, and disposed on the pyroelectric material with electrical connections made in such a way that the infrared detecting segments are opposite to each other in polarity, in which the upper side of the close to trapezoidal shape of one of the infrared detecting segments is aligned in the same direction as the lower side of the close to trapezoidal shape of the other infrared detecting segment.
The present invention also discloses a setup comprising:
  an infrared detecting segment disposed on a pyroelectric material in such a way that the upper side of one of the close to trapezoidal shapes is aligned in the same direction as the other close to trapezoidal shape; and
  a wiring board electrically connected to the infrared detecting segment via a pyroelectric material holder.
The present invention also discloses a setup comprising:
  a mounting base provided with lead electrodes;
  an infrared detector element including a pyroelectric material disposed on the mounting base and a pair of infrared detecting segments formed on the pyroelectric material in such a way that the upper side of one of the close to trapezoidal shapes is aligned in the same direction with the lower side of the other close to trapezoidal shape or the longer side of one of the close to triangular shapes is opposing to the longer side of the other close to triangular shape, further with electrical connections made in such a way that the pair of infrared detecting segments are opposite to each other in polarity;

a cylindrical encapsulating member surrounding at least the infrared detector element;

an infrared ray incident window covering an opening of the encapsulating member; and a lens array located apart upward from the infrared ray incident window and formed of a plurality of diffraction type optical elements, the lens array having a focal length extending to as far as the vicinity of the infrared detecting element.

The present invention also discloses a setup comprising: mounting base provided with lead electrodes;

an infrared detector element including a pyroelectric material disposed on the mounting base and a pair of infrared detecting segments formed on the pyroelectric material in such a way that the upper side of one of the close to trapezoidal shapes is aligned in the same direction as the lower side of the other close to trapezoidal shape or the longer side of one of the close to triangular shapes is opposing to the longer side of the other close to triangular shape, with electrical connections made in such a way that the pair of the infrared detecting segments are opposite to each other in polarity;

a cylindrical encapsulating member surrounding at least the infrared detecting element; and an infrared ray incident window lens array located to cover an opening of the encapsulating member and formed of a plurality of diffraction type optical elements with a focal length thereof extending to as far as the vicinity of the infrared detecting element.

With the foregoing setups realized by the present invention, from whatever directions an object to be detected may make an intrusion, respective areas of the infrared detecting segment traversed by the object to be detected are not the same with one another, thereby allowing an output to be generated without cancellation even when two outputs different from each other in polarity are generated simultaneously.

BRIEF DESCRIPTION OF THE DRAWINGS

FIG. 1(*a*) is a top view of an infrared detector element in a first exemplary embodiment of the present invention and FIG. 1(*b*) is a cross-sectional view of the infrared detector element of FIG. 1(*a*) cut across along the line A—A.

FIG. 5(*a*) is a top view of an infrared sensor unit in a third exemplary embodiment of the present invention and FIG. 5(*b*) is a cross-sectional view of the infrared sensor unit of FIG. 5(*a*) cut across along the line B—B.

FIG. 6(*a*) is a top view of an infrared sensor unit in another exemplary embodiment of the present invention and FIG. 6(*b*) is a cross-sectional view of the infrared sensor unit of FIG. 6(*a*) cut across along the line B—B.

FIG. 7(*a*) is a top view of an infrared sensor unit in a fourth exemplary embodiment of the present invention and FIG. 7(*b*) is a side view of the infrared sensor unit of FIG. 7(*a*).

FIG. 11(*a*) is a plan view of an infrared detector element for describing a technical background of the present invention and FIG. 11(*b*) is a cross-sectional view of the infrared detector element of FIG. 11(*a*).

DETAILED DESCRIPTION OF PREFERRED EMBODIMENTS (First Exemplary Embodiment)

Next, a description is given to an infrared detector element in a first exemplary embodiment of the present invention with reference to drawings.

Figures 1A, 1B:
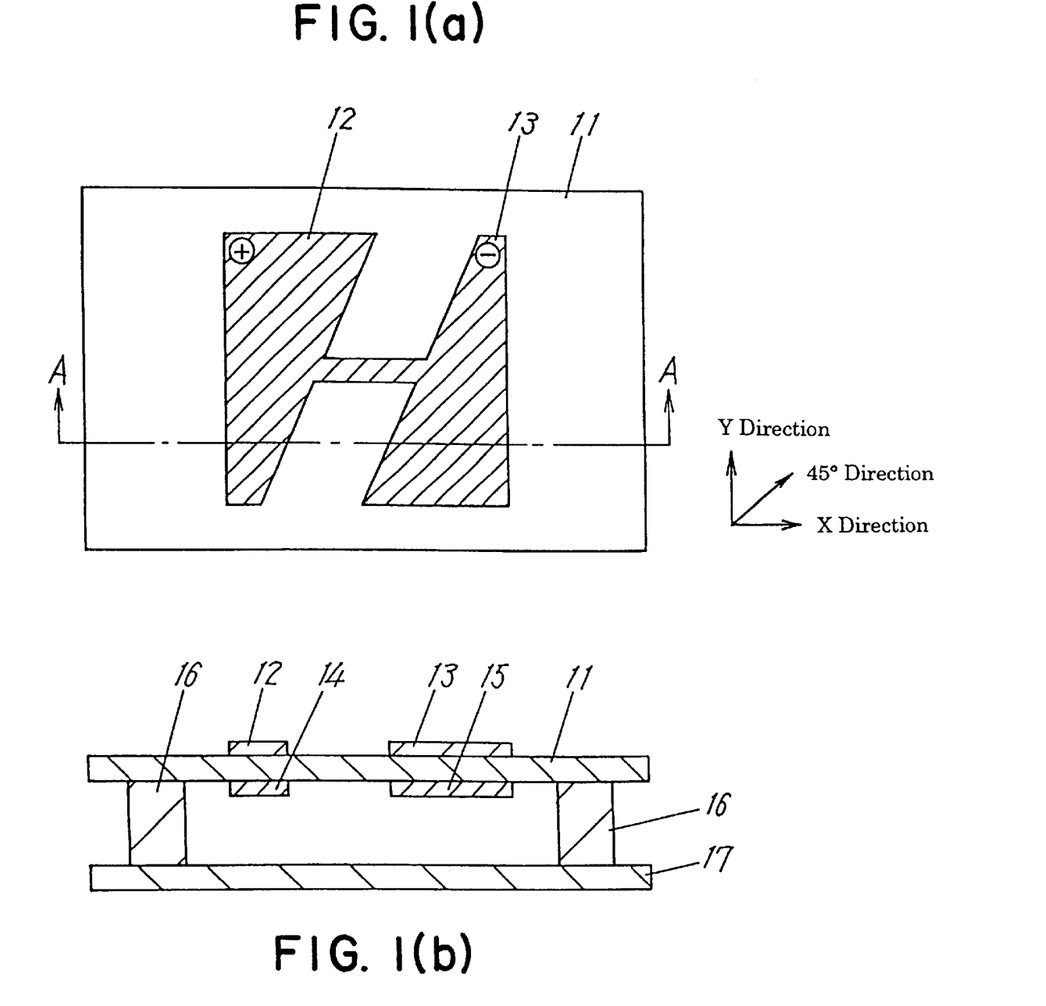

FIG. 1(*a*) is a top view of an infrared detector element in a first exemplary embodiment of the present invention and FIG. 1(*b*) is a cross-sectional view of the infrared detector element of FIG. 1(*a*) cut across along the line A—A.

In the drawings, the reference numeral 11 is a pyroelectric material formed of an $LiTaO_3$ crystal and the like. On the upper surface of the pyroelectric material 11 are formed a pair of first electrodes 12 and 13, which are close to trapezoidal in shape, respectively, and electrically connected so as to be made opposite to each other in polarity and also provided with a function of acting as an infrared ray absorbing film by sputtering Ti, Cr, Pt, Au and the like, in such a way that the upper side of the close to trapezoidal shape of the first electrode 12 on one hand is aligned in the same direction as the lower side of the close to trapezoidal shape of the first electrode 13 on the other hand. On the lower surface of the pyroelectric material 11 are formed a pair of second electrodes 14 and 15 by sputtering Ti, Cr, Pt, Au and the like, each respective position of which is corresponding to each respective position of the first electrodes 12 and 13 across the pyroelectric material 11, thereby constituting an infrared detecting segment with the first electrodes 12 and 13 and the second electrodes 14 and 15. It is preferred that the configurations of the second electrodes 14 and 15 of the infrared detecting segment are made identical, respectively, with the configurations of the first electrodes 12 and 13, which are disposed by opposing to the second electrodes 14 and 15 across the pyroelectric material 11, because an adverse effect caused by stray capacity can be eliminated.

The first electrodes 12 and 13 and the second electrodes 14 and 15 constituting the infrared detecting segment are connected in series or in parallel so as to be made opposite to each other in polarity, and further the spacing between the second electrodes 14 and 15 are usually made the same as the spacing between the first electrodes 12 and 13 or at least 0.8 mm or larger, thereby realizing a dual element type infrared detector element with a minimal adverse effect caused by crosstalk.

This infrared detector element is connected to a wiring board 17 via the pyroelectric material 11 and a pyroelectric material holder 16 while the infrared detecting segment being kept under a thermally insulated state.

Next, a description is given to how the infrared detector element structured as above operates.

When an object to be detected such as people and the like moves in a direction crossing the infrared detecting segment (in the X direction) and intrudes in a detecting domain created by the first electrodes 12 and 13, an "output in the plus direction" is generated and, when the object to be detected in succession intrudes in a detecting domain created by the second electrodes 14 and 15, an "output in the minus direction" is generated because the first electrodes 12 and 13 and the second electrodes 14 and 15 are connected opposite to each other in output polarity. As a result, the magnitude of the sensor output becomes the sum of the "plus output peak" value and the "minus output peak" value.

On the other hand, when an object to be detected moves in parallel to the infrared detecting segment (in the Y direction), the object to be detected intrudes in both the detecting domains created by the first electrodes 12 and 13 and the second electrodes 14 and 15 at the same time, thereby generating an "output in the plus side" in the beginning because there is a difference in the magnitude of output between the detecting domain created by the first electrodes 12 and 13 and the detecting domain created by the second electrodes 14 and 15. However, as the size of each respective detecting domain varies continuously, the sensor output changes to the "minus side" later. At any rate, the sum of a "plus output peak" value and a "minus output peak" value is obtained as the sensor output.

When an object to be detected moves in a 45° direction, the object to be detected intrudes in the detecting domain created by the first electrodes 12 and 13, thereby generating a "plus side output". Then, the object to be detected intrudes in both the detecting domains created by the first electrodes 12 and 13 and the second electrodes 14 and 15. However, the detecting domain created by the first electrodes 12 and 13 is larger in the beginning, thereby generating a "plus side output" and then the detecting domain of the second electrodes 14 and 15 gradually becomes large, resulting in an increased generation of a "minus side output". Then, the object to be detected intrudes only in the detecting domain created by the second electrodes 14 and 15, thereby generating a "minus side output". As the sensor output, the sum of a "plus output peak" value and a "minus output peak" value is obtained.

Accordingly, from whatever directions an object to be detected may intrude, respective areas of the infrared detecting segment traversed by the object to be detected are not the same with one another. Even if a "plus output" and a "minus output" are generated simultaneously, an output can be produced without cancellation. Therefore, an output can be obtained against the movement of an object to be detected that may take place in whatever directions.

(Second Exemplary Embodiment)

Next, a description is given to an infrared detector element in a second exemplary embodiment of the present invention with reference to drawings.

Figure 2:
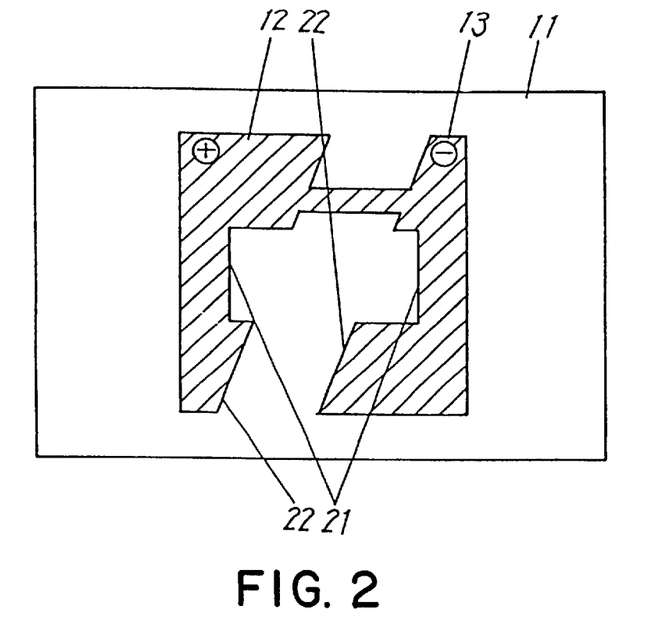
FIG. 2 is a top view of an infrared detector element in a second exemplary embodiment of the present invention.

FIG. 2 is a top view of an infrared detector element in a second exemplary embodiment of the present invention. Since the infrared detector element in the second exemplary embodiment of the present invention is essentially the same as the one in the first exemplary embodiment in construction as shown in FIG. 1, the same reference numerals are assigned to the same components as used in the first exemplary embodiment, thereby omitting here the description of each respective component. The only difference between the infrared detector elements in the first exemplary embodiment and the second exemplary embodiment is in a notch 21 provided on each of diagonal sides of the close to trapezoidal shapes of the infrared detecting segment, the diagonal sides being situated by opposing to each other.

In the drawing, the reference numeral 11 is a pyroelectric material. On the upper surface of the pyro-electric material 11 are formed a pair of first electrodes 12 and 13, which are close to trapezoidal in shape, respectively, and electrically connected so as to be made opposite to each other in polarity and also provided with a function of acting as an infrared ray absorbing film, in such a way that the upper side of the close to trapezoidal shape of the first electrode 12 on one hand is aligned in the same direction as the lower side of the close to trapezoidal shape of the first electrode 13 on the other hand. On the lower surface of the pyroelectric material 11 are provided second electrodes 14 and 15 (not shown in the drawing), preferably having the same shape as the first electrodes 12 and 13, respectively, the positions of which are corresponding to the positions of the first electrodes 12 and 13 with the pyroelectric material 11 sandwiched therebetween, thereby constituting an infrared detecting segment with the first electrodes 12 and 13 and the second electrodes 14 and 15. A notch 21 is provided on each of a pair of diagonal sides of at least the first electrodes 12 and 13, the diagonal sides being situated by opposing to each other.

Accordingly, with the notch 21 formed at least on each of the second electrodes 12 and 13 of the infrared detecting segment, even when an object to be detected such as people and the like makes small movements between the first electrodes 12 and 13 acting as an infrared ray absorbing film of the infrared detecting segment, no output is generated simultaneously from each of the first electrodes 12 and 13 because the object to be detected is not likely to traverse the detecting domain created by the first electrodes 12 and 13 by presenting the same traversed area with each other at the same time, thereby enabling the infrared detector element to generate an output even when the object to be detected makes small movements.

Figure 3:
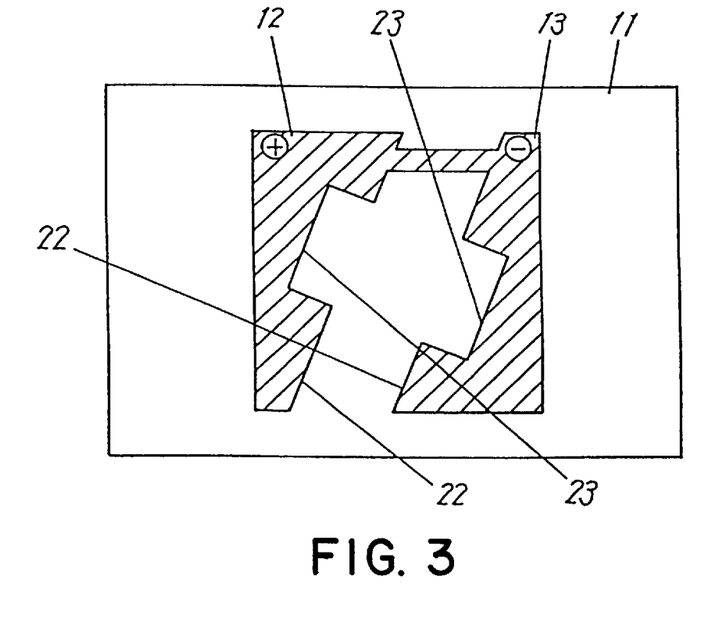
FIG. 3 is a top view of an infrared detector element in another exemplary embodiment of the present invention.

In addition, by having the notch 21 described in the present exemplary embodiment replaced with close to a rectangular notch 23 formed on the sloped side 22 of the trapezoidal electrode shape perpendicularly thereto as shown in FIG. 3, the object to be detected is not likely to traverse the detecting domain created by the first electrodes 12 and 13 by showing the same traversed area with each other simultaneously, thereby eliminating the possibilities of a cancellation caused by the difference in varying values due to the notch 23 and assuring the generation of an output.

Figure 4:
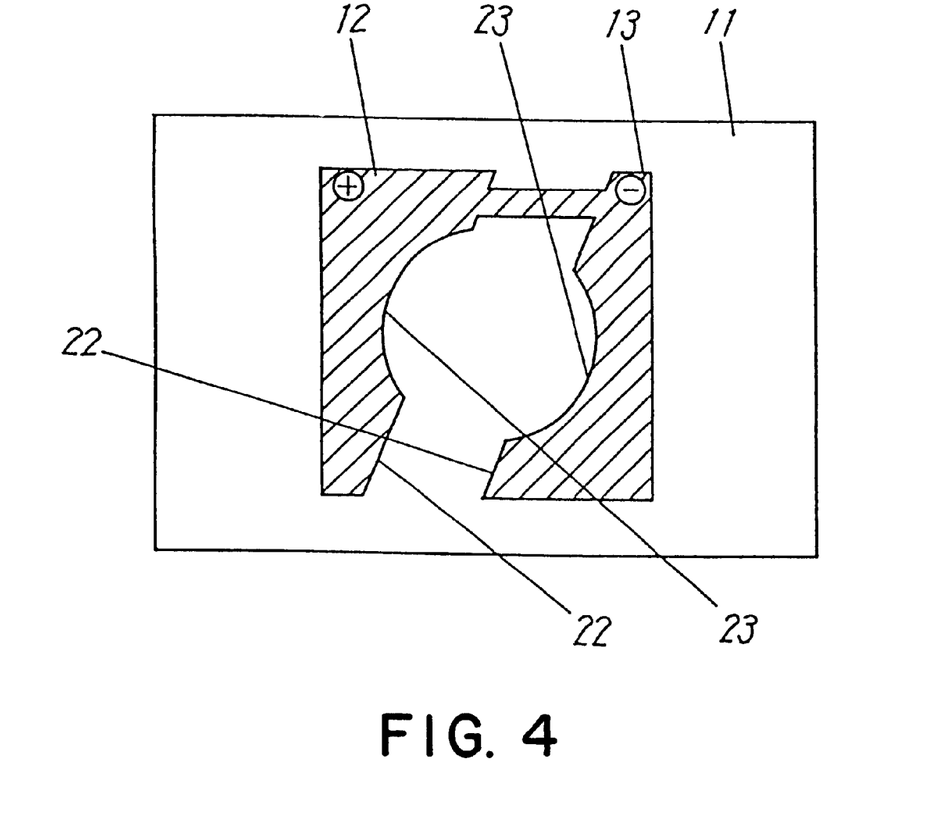
FIG. 4 is a top view of an infrared detector element in still another exemplary embodiment of the present invention.

Even when the notch 21 as described in the present exemplary embodiment is replaced with close to a circular arc like notch 23 formed on the sloping side 22 of the trapezoidal electrode shape as shown in FIG. 4, the same effect as with the close to rectangular notch 23 can be expected.

(Third Exemplary Embodiment)

Next, a description is given to an infrared sensor unit in a third exemplary embodiment of the present invention with reference to drawings.

Figure 5A:
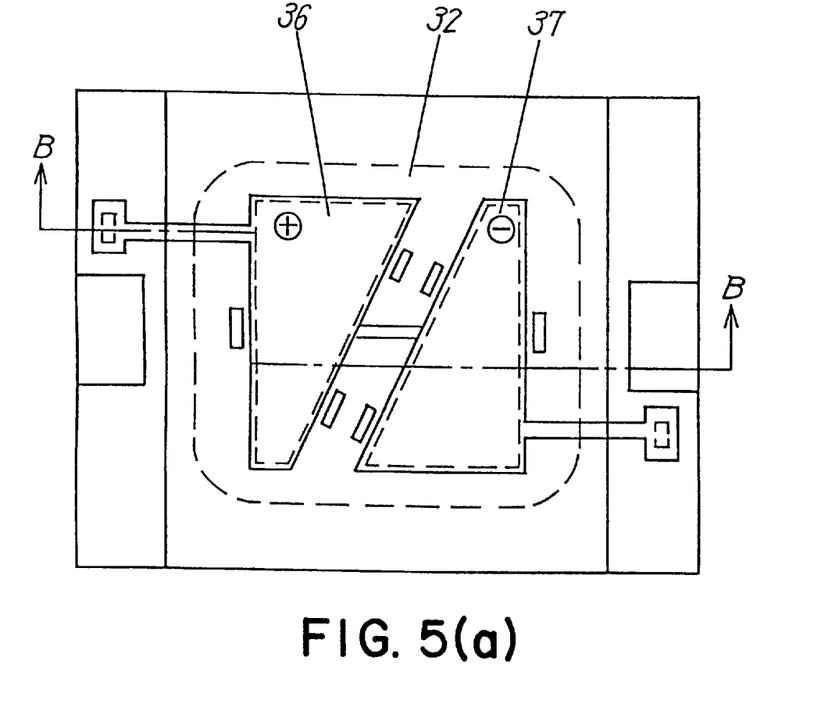
Figure 5B:
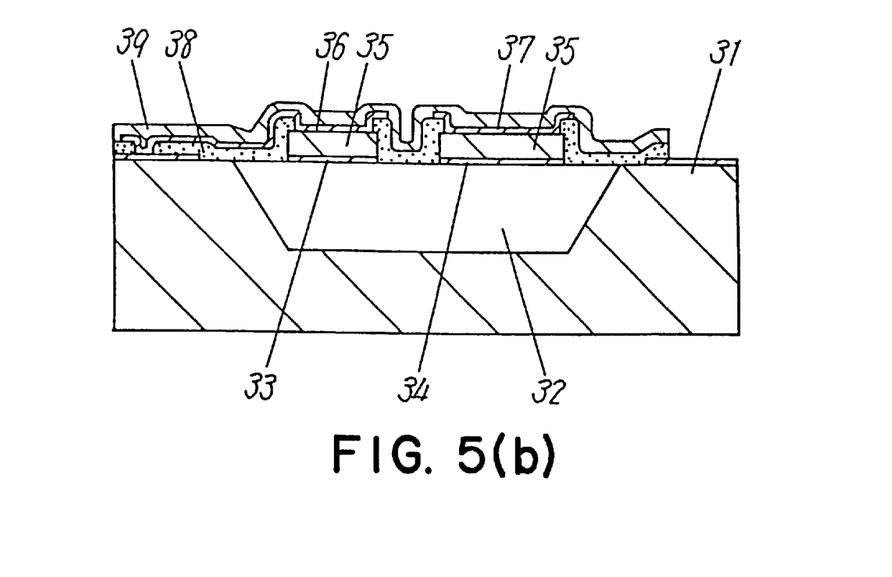
Figure 6A:
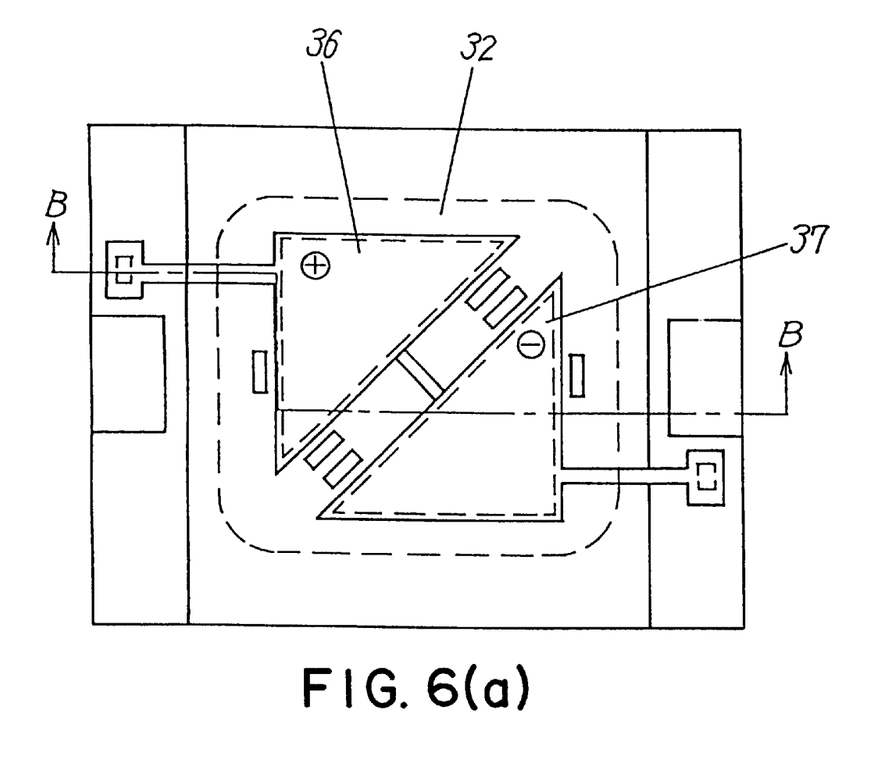
Figure 6B:
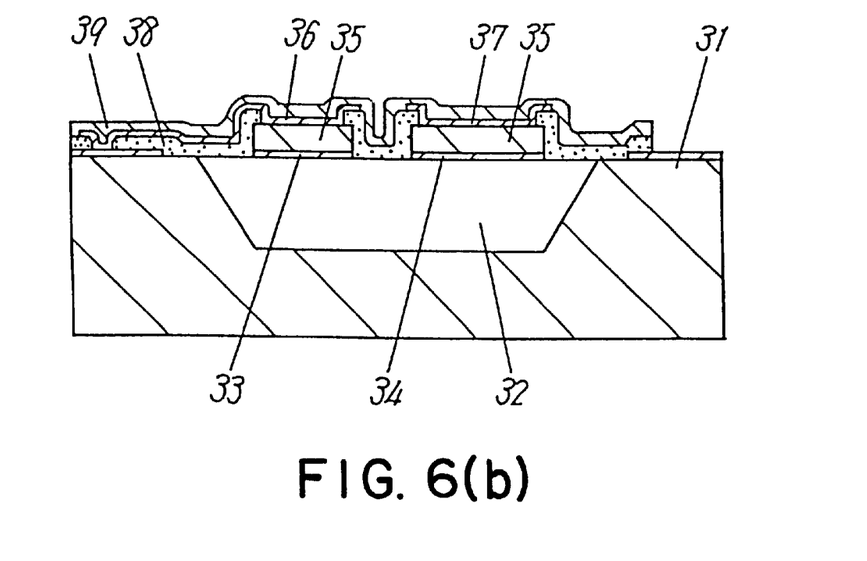

FIG. 5(*a*) is a top view of an infrared sensor unit in a third exemplary embodiment of the present invention and FIG. 5(*b*) is a cross-sectional view of the infrared sensor unit of FIG. 5(*a*) cut across along the line B—B.

In the drawing, the reference numeral 31 is a substrate formed of at least a single crystal of magnesium oxide and a concave hollow 32 is provided under the surface of the substrate 31. There are formed on the surface of the substrate 31 above the hollow 32 a pair of second electrodes 33 and 34 formed of Pt and the like, electrically connected so as to be reversed in polarity from each other and each with close to a trapezoidal shape. On each respective upper surface of the second electrodes 33 and 34 is disposed and electrically connected thereto a pyroelectric thin film 35 formed of a single crystal of Li—TaO$_2$, PbTiO$_3$, PzT and the like. On each respective upper surface of the pyroelectric thin films 35 are disposed first electrodes 36 and 37 electrically connected so as to be reversed in polarity from each other, formed of NiCr and the like, each provide with a function of acting as an infrared ray absorbing film and arranged in position in such a way that the upper side of the close to trapezoidal shape of the first electrode 36 on one is aligned in the same direction as the lower side of the close to trapezoidal shape of the first electrode 37 on the other hand. An infrared detecting segment is formed of these first electrodes 36 and 37, pyroelectric thin film 35 and second electrodes 33 and 34, each respective shape of which is made preferably the same with others in order to have a canceling effect against the disturbance light and temperature changes of the sensor itself.

An interlayer insulating film 38 formed of polyimide and the like is provided to insulate electrically one part of the infrared detecting segment comprising the first electrode 36, pyroelectric thin film 35 and second electrode 33 from the adjoining other part of the infrared detecting segment comprising the first electrode 37, pyroelectric thin film 35 and second electrode 34 and also to hold both parts of the infrared detecting segment above the hollow 32 of the substrate 31. Further, a protective film 39 formed of polyimimide is provided to cover at least the infrared detecting segment located on the side opposite to the substrate 31. In the above setup, there are only the interlayer insulating film 38 and protective film 39 between the two parts of the infrared detecting segment, thereby allowing the thermal conductivity therebetween to be kept very small. In addition, the infrared detecting segment is contained within an area of about 750 $\mu$m square and measures about 3 $\mu$m in thickness, thus realizing small constructuion. Therefore, there is no danger of bringing about a thermal stroke between the first electrodes 36 and 37 since each respective electrode is insulated from the other, thereby enabling the pyroelectric thin film 35 to enhance thermal responsivity and also to reduce size and thickness. By having the substrate formed of a single crystal of magnesium oxide as the main ingredient, the enforced orientation process required for a natural light distribution of the pyroelectric thin film 35 can be eliminated.

Although close to a trapezoidal shape is adopted as the configuration of the first electrodes 36 and 37, respectively, for the infrared detecting segment in the present exemplary embodiment, the same effect can be achieved by having close to a triangular shape adopted instead of the trapezoidal shape, with the longer side thereof situated opposite to the longer side of the other triangular shape.

(Fourth Exemplary Embodiment)

Next, a description is given to an infrared sensor unit in a fourth exemplary embodiment of the present invention with reference to drawings.

Figure 7A:
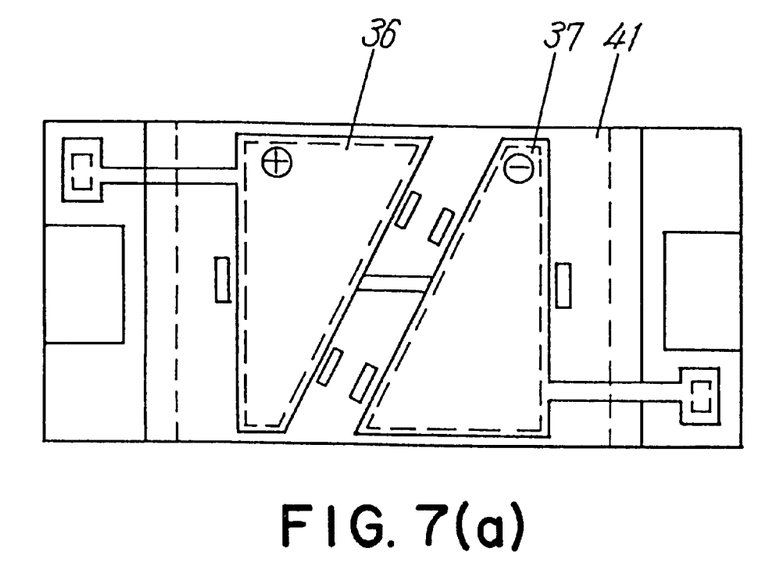
Figure 7B:
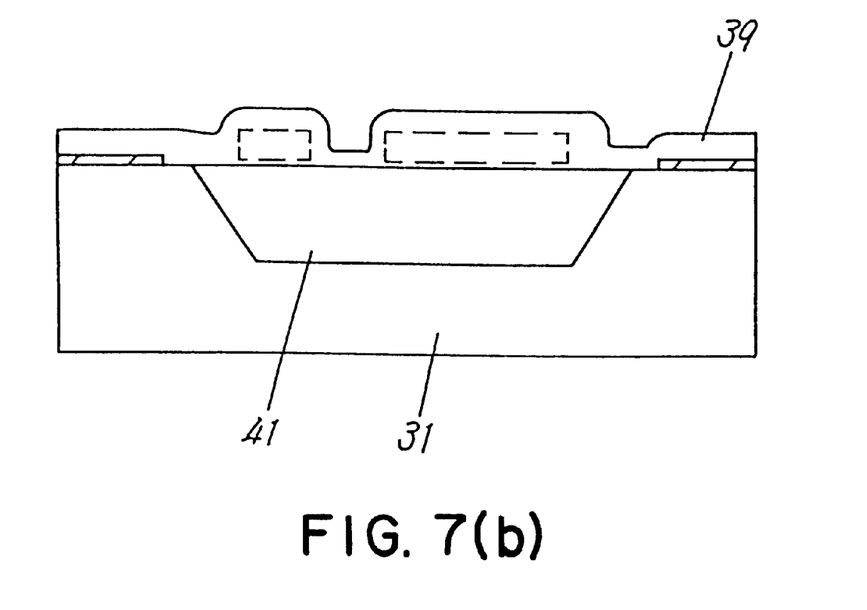

FIG. 7($a$) is a top view of an infrared sensor unit in a fourth exemplary embodiment of the present invention and FIG. 7($b$) is a side view of the infrared sensor unit of FIG. 7($a$).

Since the fourth exemplary embodiment of the present invention as shown in FIG. 7 is essentially the same as the third exemplary embodiment as shown in FIG. 5 in construction, the same reference numerals are assigned to the same components as used in the third exemplary embodiment, thereby omitting a detailed description of each respective component.

What differs from the third exemplary embodiment is in having a concave hollow 41 provided under the surface of the substrate 31 in such a way as extending all the way between a pair of opposing side surfaces of the substrate 31. The substrate 31 is formed of a single crystal of mangesium oxide and the like and the hollow 41 is disposed below the surface of the substrate 31 so as to extend all the way between the pair of opposing side surfaces of the substrate 31. There is no difference other than that in construction from the third exemplary embodiment as shown in FIG. 5 and, therefore, a further description of the present exemplary embodiment is omitted.

As described in the above, with the hollow 41 provided in such a way as extending all the way between the pair of opposing side surfaces of the substrate 31, the total area occupied by one infrared sensor unit is reduced and the more number of the infrared sensor unit can be gained from one substrate sheet because of the smaller total area occupied by an individual infrared sensor unit, thereby producing an effect of further reducing costs.

(Fifth Exemplary Embodiment)

Next, a description is given to an infrared detecting device in a fifth exemplary embodiment of the present invention with reference to drawings.

Figure 8:
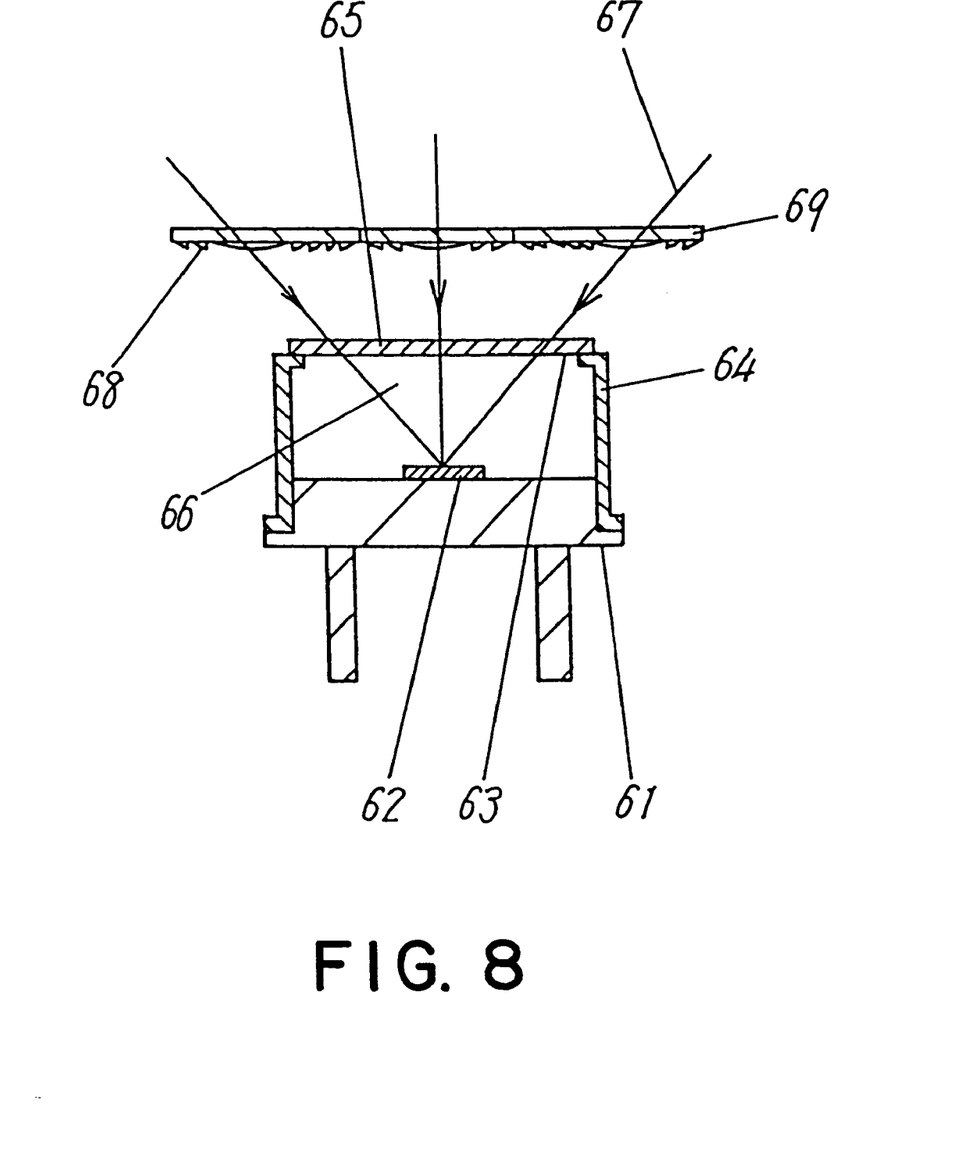
FIG. 8 is a side view of an infrared detecting device in a fifth exemplary embodiment of the present invention.

FIG. 8 is a side view of an infrared detecting device in a fifth exemplary embodiment of the present invention.

In FIG. 8, the reference numeral 61 is a mounting base provided with lead electrodes. (Not shown in FIG. 8) The infrared detector element 62 as described in the first exemplary embodiment or in the second exemplary embodiment is disposed on the upper surface of the mounting base 61 with electrical connections established between the infrared detector element 62 and the lead electrodes. The infrared detector element 62 has a structure at least including a pyroelectric material (not shown in FIG. 8) and a pair of infrared detecting segments (not shown in FIG. 8) formed on the pyroelectric material in such a way that the upper side of one infrared detecting segment shaped like close to a trapezoid is aligned in the same direction with the lower side of the other infrared detecting segment shaped like close to a trapezoid or the longer side of one infrared detecting segment shaped like close to a triangle is opposing to the longer side of the other infrared detecting segment, further with electrical connections made in such a way that the pair of infrared detecting segments are opposite to each other in polarity. There is a cylindrical encapsulating member 64 surrounding at least the infrared detector element 62 affixed to the peripheral surface of the mounting base 61. The encapsulating member 64 is formed of iron, Kovar, silicon or the like to cut off disturbance light and electromagnetic noise. An upper opening of the encapsulating member 64 is covered with an infrared ray incident window 65 formed of silicon or silicon provided on the surface thereof with a filter prepared by the use of germanium and zinc sulfide. A space 66 surrounded by the infrared ray incident window 65, encapsulating member 64 and mounting base 61 directs infrared rays 67 to the infrared detector element 62.

Inside the space 66 is contained a mixture of oxygen and a low thermal conductivity gas with a main ingredient of Xe, Kr or freon alone, respectively, or a mixture of the foregoing gases, with the gaseous pressure of the low thermal conductivity gas kept below atmospheric pressure. When as the freon gas of the low thermal conductivity gas is mainly used a HCFC family formed of CHClF$_2$, CHCl$_2$CF$_3$,CH$_3$CClF, CH$_3$CClF$_3$, C$_3$HCl$_3$F$_3$ and the like, a low thermal conductivity gas with the thermal conductivity of 0.012 W/mk or less is realized, thereby producing an effect of attaining high sensitivity for an infrared detecting device. Similarly, when as the freon gas of the low thermal conductivity gas is used a $CF_3I$ family gas mainly formed of $CF_3I$, a low thermal conduction gas with the lowest possible conductivity of 0.0069 W/mk is realized, thereby producing an effect of attaining higher sensitivity for an infrared detecting device.

Furthermore, by having an absorbent (not shown in FIG. 8) formed of $SiO_2$ and the like in gel form contained in the space 66 for absorbing the gas degassed inside the space 66 to suppress the degassing, thereby producing an effect of realizing stabilized performance for an infrared detecting device.

In addition, there provided is a lens array 69 formed of a plurality of diffraction type optical elements with the same optical elements (not shown in FIG. 8) as the foregoing infrared detector element 62 apart upward from the infrared ray incident window 65 by a distance corresponding to the focal length of the lens array 69. Each respective diffraction type optical element 68 of the lens array 69 has asperities on the surface thereof formed in accordance with the magnitude of phase modulation of the lens. For example, the pattern of asperities becomes smaller in periodicity with an increase in the distance from the center, thereby allowing light to gather to one point due to a diffraction phenomenon. At this time, the depths of asperities are made uniform throughout the diffraction type optical element 68 and formed together with the surface contour according to the wavelength of incident infrared rays. The spacing between respective adjoining diffraction type optical elements 68 measures several microns to hundreds of microns and the depth thereof is small ranging from 2 microns to 4 microns and each respective diffraction type optical element 68 as such can be produced readily by a dry etching method.

Figure 9:
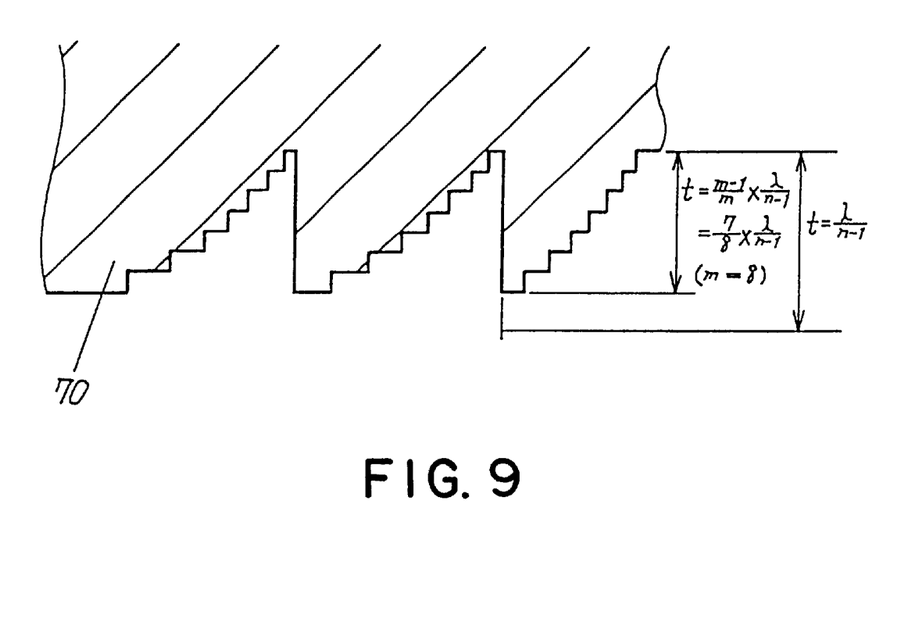
FIG. 9 is a cross-sectional view of diffraction type optical elements of the infrared detecting device in the fifth exemplary embodiment of the present invention.

Each of the diffraction type optical elements 68 has an asperity pattern 70 as shown in FIG. 9 and the cross-section thereof shows a step-wise configuration with "m" steps. FIG. 9 shows the case where "m" equals to 8.

The maximum depth "t" of the asperity pattern 70 is obtained by an equation as follows:

$$t = [(m-1)/m] \times [\lambda/(n-1)]$$

where "λ" is the wavelength of an incident infrared ray and "n" is the refractive index of the diffraction type optical element 68. As the step number "m" increases, the light-gathering efficiency increases. When "m" equals to 16, the light-gathering efficiency is enhanced to as high as about 99%. At this time, the optimum depth "t" for the asperity pattern 70 becomes about "λ/(n−1)", thereby producing an effect of enabling the production of the diffraction type optical elements 68 as such easily by a dry etching method.

With the present exemplary embodiment, by employing as the material of the lens array a material with the refractive index of 3 or larger and containing at least Si or Ge, or containing at least one selected from Ge and In and at least one selected from As and P, the depth of asperities becomes smaller, thereby making it easier to process the material for the lens array. The requirement of the refractive index of 3 or larger is derived from the relation that the depth of asperities is governed by an equation of "wavelength/(refractive index −1).

(Sixth Exemplary Embodiment)

Next, a description is given to an infrared detecting device in a sixth exemplary embodiment of the present invention with reference to drawings.

Figure 10:
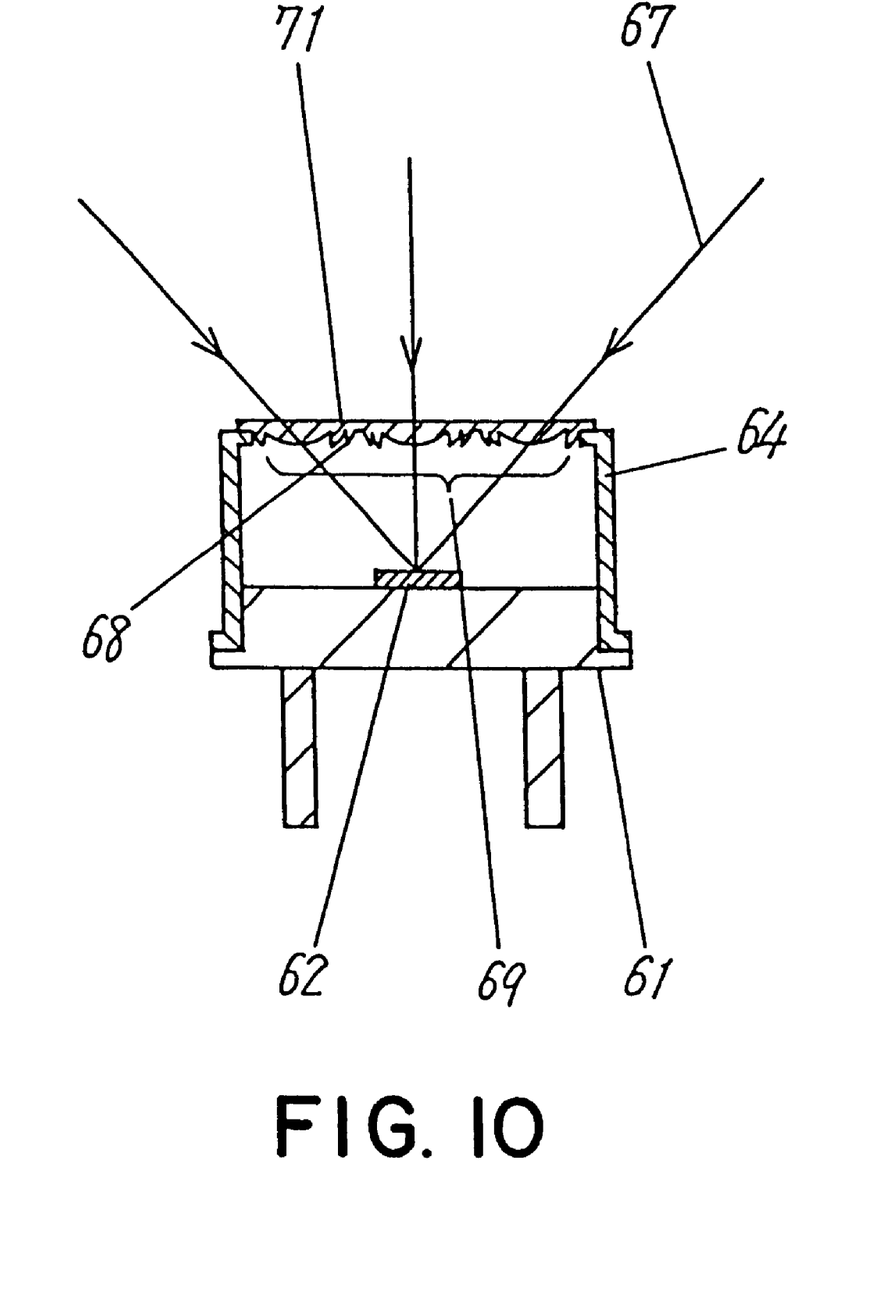
FIG. 10 is a side view of an infrared detecting device in a sixth exemplary embodiment of the present invention.

FIG. 10 is a side view of an infrared detecting device in a sixth exemplary embodiment of the present invention. Since the present exemplary embodiment as shown in FIG. 10 is essentially the same as the fifth exemplary embodiment as shown in FIG. 8 in construction, the same reference numerals are assigned to the same components as used in the fifth exemplary embodiment, thereby omitting a description of each respective component. What is different between the present exemplary embodiment and the fifth exemplary embodiment is in replacing the infrared ray incident window described in the fifth exemplary embodiment directly with an infrared ray incident window lens array comprising a lens array formed of a plurality of diffraction type optical elements.

In FIG. 10, the reference numeral 64 is a cylindrical encapusulating member surrounding at least the infrared detecotr element 62 and affixed to the peripheral surface of the mounting base 61. An upper opening of the encapsulating member 64 is covered with an infrared ray incident window lens array 71, which is produced by disposing a lens array 69 formed of a plurality of diffraction type optical elements on silicon or on the surface of silicon provided with a filter prepared by using germanium and zinc sulfide.

Accordingly, the use of the infrared ray incident window lens array 71, in which a lens array and an infrared ray incident window are combined in one piece, makes it possible to produce an effect of providing an infrared detecting device of a lower cost and a smaller size.

In the fifth and sixth exemplary embodiments, the asperity pattern of each respective diffraction type optical element 68 is made oval in shape and the center of each respective oval figure is shifted gradually in one of the directions along the longer axis of the oval figure as the position of the oval figure moves outward, thereby having optical aberrations corrected and producing an effect of eliminating abberations even when diffration type optical elements are formed in one plane.

INDUSTRIAL USABILITY

As described in the above, the present invention discloses a set up, in which a pair of infrared detecting segments are provided in such a way that respective infrared detecting segments, each having close to a trapezoidal shape, are connected so as to be opposite to each other in polarity and the upper side of one of the infrared detecting segments is aligned in the same direction as the lower side of the other infrared detecting segment or a pair of infrared detecting segments are provided in such a way that respective infrared detecting segments, each having close to a triangular shape, are connected so as to be opposite to each other in polarity and the longer side of one of the infrared detecting segments is opposing to the longer side of the other infrared detecting segment, thereby producing an effect of gaining an output, in whatever directions an object to be detected may move.

What is claimed:

1. An infrared detector element comprising:

a pyroelectric material, and a pair of infrared detecting segments including a pair of first electrodes and a pair of second electrodes, said pair of first electrodes being disposed on one surface of said pyroelectric material, said pair of second electrodes being disposed on an other surface of said pyroelectric material, each pair of infrared detecting segments including one of said pair of first electrodes and one of said pair of second electrodes, each of said pair of first electrodes being close to trapezoidal in shape, respectively, and each said first electrode being disposed on said pyroelectric material with electrical connections made in such a way that each first electrode is opposite to each other in polarity, an upper side of the close to trapezoidal shape of one of said first electrodes being aligned in the same direction as a lower side of the close to trapezoidal shape of the other first electrode, said pair of second electrodes having the same shape as said pair of first electrodes.

2. The infrared detector element according to claim 1, wherein each of said pair of electrodes is opposite in polarity to the other.

3. The infrared detector element according to claim 1, wherein a notch is provided on a sloped side of the close to trapezoidal shape of each first electrode, the sloped side being situated directly opposite to the sloped side of the opposing trapezoidal shape.

4. The infrared detector element according to claim 1, wherein a notch, which is close to rectangular in shape, is provided on a sloped side of the close to trapezoidal shape of each first electrode perpendicularly thereto, the sloped side being situated directly opposite to the sloped side of the opposing trapezoidal shape.

5. The infrared detector element according to claim 1, wherein a notch, which is close to a circular arc in shape, is provided on a sloped side of the close to trapezoidal shape of each first electrode, the sloped side being situated directly opposite to the sloped side of the opposing trapezoidal shape.

6. The infrared detector element according to claim 3, wherein the infrared detecting segment is at least the first electrode.

7. The infrared detector element according to claim 2, wherein a notch is provided on a sloped side of the close to trapezoidal shape of each respective first electrode, the sloped side being situated directly opposite to the sloped side of the opposing trapezoidal shape.

8. The infrared detector element according to claim 2, wherein a notch, which is close to a rectangular shape, is provided on a sloped side of the close to trapezoidal shape of said each respective first electrode perpendicularly thereto, the sloped side being situated directly opposite to the sloped side of the opposing trapezoidal shape.

9. The infrared detector element according to claim 2, wherein a notch, which is close to a circular arc in shape, is provided on a sloped side of the close to trapezoidal shape of said each respective first electrode, the sloped side being situated directly opposite to the sloped side of the opposing trapezoidal shape.

10. The infrared detector element according to claim 8, wherein said infrared detecting segment is at least the first electrode.

11. The infrared detector element according to claim 9, wherein said infrared detecting segment is the first electrode.

12. An infrared sensor unit comprising:
a pyroelectric material,
an infrared detecting segment having a pair of first electrodes and a pair of second electrodes, said pair of first electrodes being disposed on one surface of said pyroelectric material, said pair of second electrodes being disposed on the other surface of said pyroelectric material, each of said pair of first electrodes being close to a trapezoidal shape, each first electrode being disposed on said pyroelectric material in such a way that an upper side of one of the close to trapezoidal shapes is aligned in the same direction as the lower side of the other close to trapezoidal shape; and
a wiring board is electrically connected with the infrared detecting segment via a pyroelectric material holder.

13. The infrared sensor unit according to claim 12, wherein,
said pair of first electrodes have a function of absorbing infrared rays, each of said first electrodes is opposite to the other in polarity; and said pair of second electrodes have the same shape as said pair of first electrodes.

14. The infrared sensor unit according to claim 12, wherein a notch is provided on a sloped side of the close to trapezoidal shape of said first electrodes, the sloped side being situated directly opposite to the sloped side of the opposing trapezoidal shape.

15. The infrared sensor unit according to claim 12, wherein a notch, which is close to a rectangular shape, is provided on a sloped side of the close to trapezoidal shape of each first electrode perpendicularly thereto, the sloped side being situated directly opposite to the sloped side of the opposing trapezoidal shape.

16. The infrared sensor unit according to claim 12, wherein a notch, which is close to a circular arc in shape, is provided on a sloped side of the close to trapezoidal shape of each respective first electrode, the sloped side being situated directly opposite to the sloped side of the opposing trapezoidal shape.

17. The infrared sensor unit according to claim 13, wherein the first electrode, pyroelectric thin film and second electrode are the same in shape.

18. An infrared sensor unit comprising:
a substrate provided with a hollow under a surface thereof;
a pyroelectric material;
a pair of infrared detecting segments, each of said pair of infrared detecting segments being close to a trapezoidal shape, said pair of infrared detecting segments being disposed to upward of the substrate in such a way that an upper side of one of the close to trapezoidal shapes is aligned in the same direction as a lower side of the other close to trapezoidal shape;
an interlayer insulating film to insulate electrically each of said pair of infrared detecting segments to each other, one of said pair of infrared detecting segments adjoining to each other from the other infrared detecting segment and also to hold said infrared detecting segments above said hollow of the surface of the substrate; and
a protective film disposed so as to cover at least the surface of said pair of infrared detecting segments situated opposite to said interlayer insulating film.

19. The infrared sensor unit according to claim 18, wherein the pair of infrared detecting segments comprise:
a pyroelectric thin film;
a pair of first electrodes, which have a function of absorbing infrared rays, are close to trapezoidal in shape, and are disposed on the upper surface of said pyroelectric thin film with electrical connections made in such a way that said first electrodes are opposite to each other in polarity; and
a pair of second electrodes disposed on the other surface of said pyroelectric thin film and electrically connected.

20. The infrared sensor unit according to claim 18, wherein the hollow is provided in such as way as extending all the way between a pair of opposing side surfaces of the substrate.

21. The infrared sensor unit according to claim 18, wherein the substrate is formed of a single crystal having at least magnesium oxide as the main ingredient.

22. The infrared sensor unit according to claim 18, wherein a notch is provided on a sloped side of the close to trapezoidal shape of each of said pair of infrared detecting segments, the sloped side being situated directly opposite to the sloped side of the opposing trapezoidal shape.

23. The infrared sensor unit according to claim 18, wherein a notch with close to a rectangular shape is provided on a sloped side of the close to trapezoidal shape of each of said pair of infrared detecting segments perpendicularly thereto, the sloped side being situated directly opposite to the sloped side of the opposing trapezoidal shape.

24. The infrared sensor unit according to claim 18, wherein a notch with close to a circular arc in shape is provided on a sloped side of the close to trapezoidal shape of each of said pair of infrared detecting segments, the sloped side being situated directly opposite to the sloped side of the opposing trapezoidal shape.

25. The infrared sensor unit according to claim 18, wherein an infrared detecting segment is at least a first electrode.

26. The infrared sensor unit according to claim 18, having a first electrode, pyroelectric thin film and second electrode which are the same in shape.

27. The infrared sensor unit of claim 18,
wherein said each infrared segment includes a first electrode and a second electrode,
said first electrode is disposed on one surface of said pyroelectric material,
said second electrode is disposed on the other surface of said pyroelectric material,
said second electrode is the same shape as said first electrode in a top view, and
said first electrode and said second electrode are disposed at the opposite place via said pyroelectric material.

28. An infrared sensor unit comprising:
a substrate provided with a hollow under the surface thereof;
a pair of infrared detecting segments, each of said pair of infrared detecting segments being close to a triangular shape, said pair of infrared detecting segments being disposed to upward of said substrate in such a way that the longer side of one of the close to triangular shapes is opposite to the longer side of the other close to triangular shape;
an interlayer insulating film to insulate electrically each of said pair of infrared detecting segments to each other, one of said infrared detecting segments adjoining to each other from the other infrared detecting segment and also to hold said pair of infrared detecting segments above said hollow of the surface of the substrate; and
a protective film disposed so as to cover at least the surface of said pair of infrared detecting segments situated opposite to said interlayer insulating film.

29. The infrared sensor unit according to claim 28, wherein said pair of infrared detecting segments comprise:
a pyroelectric thin film;
a pair of first electrodes, which have a function of absorbing infrared rays, are close to trapezoidal in shape, and are disposed on the upper surface of said pyroelectric thin film with electrical connections made in such a way that said first electrodes are opposite in polarity; and
a pair of second electrodes disposed on the other surface of said pyroelectric thin film and are electrically connected.

30. The infrared sensor unit according to claim 28, wherein a notch is provided on a sloped side of the close to trapezoidal shape of each of said pair of infrared detecting segments, the sloped side being situated directly opposite to the sloped side of the opposing trapezoidal shape.

31. The infrared sensor unit according to claim 28, wherein a notch with close to a rectangular shape is provided on a sloped side of the close to trapezoidal shape of each of said pair of infrared detecting segments perpendicularly thereto, the sloped side being situated directly opposite to the sloped side of the opposing trapezoidal shape.

32. The infrared sensor unit according to claim 28, wherein a notch with close to a circular arc in shape is provided on a sloped side of the close to trapezoidal shape of each of said pair of infrared detecting segments, the sloped side being situated directly opposite to the sloped side of the opposing trapezoidal shape.

33. The infrared sensor unit according to claim 28, wherein an infrared detecting segment is at least a first electrode.

34. The infrared sensor unit according to claim 28, having a first electrode, pyroelectric thin film and second electrode which are the same in shape.

35. The infrared sensor unit according to claim 28, wherein said hollow is provided in such a way as extending all the way between a pair of opposing side surfaces of said substrate.

36. The infrared sensor unit according to claim 28, wherein said substrate is formed of a single crystal having at least magnesium oxide as the main ingredient.

37. The infrared sensor unit of claim 28,
wherein each infrared segment includes a first electrode and a second electrode,
said first electrode is disposed on one surface of said pyroelectric material,
said second electrode is disposed on the other surface of said pyroelectric material;
said second electrode is the same shape as said first electrode in a top view, and
said first electrode and said second electrode are disposed at the opposite place via said pyroelectric material.

38. An infrared detecting device comprising:
a mounting base having a lead electrode;
an infrared detector element having a pyroelectric material and a pair of infrared detecting segments, each of said pair of infrared detecting segments being close to trapezoidal or triangular in shape, respectively, each infrared segment being disposed on said pyroelectric material mounted on said mounting base in such a way that (i) an upper side of one of the close to trapezoidal shapes is aligned in the same direction as a lower side of the other close to trapezoidal shape or (ii) a longer side of one of the close to triangular shapes is opposing to the longer side of the other close to triangular shape, each infrared detecting segment being electrically connected in such a way that each infrared detecting segment is opposite to each other in polarity;
a cylindrical encapsulating member provided in such a way as surrounding at least said infrared detector element;
an infrared ray incident window provided in such a way as covering an opening of said infrared ray incident window; and
a lens array having a plurality of diffraction type optical elements, said lens array being provided apart upward from said infrared ray incident window, said plurality of diffraction type optical elements having said infrared detector element located at a distance corresponding to the focal length of said lens array.

39. The infrared detecting device according to claim 38, wherein each respective diffraction type optical element has close to an oval asperity pattern and the center of each respective oval figure is shifted gradually in one of the directions along the longer axis of the oval figure as the diffraction type optical element shifts outward in position.

40. The infrared detecting device according to claim 38, wherein the asperity pattern of each respective diffraction type optical element shows a cross-section of a step-wise configuration with "m" steps and the maximum depth of said asperity pattern is expressed by an equation of

[(m−1)/m]×[λ/(n−1)], where "λ" is the wavelength of an incident infrared ray and "n" is the refractive index of said diffraction type optical element.

41. The infrared detecting device according to claim 38, wherein the lens array has a refractive index of 3 or larger, said lens array is formed of a first material containing at least one of Si and Ge, a second material containing at least one of Ga and In, and a third material containing at least one of As and P.

42. The infrared detecting device according to claim 38, wherein the space surrounded by the mounting base, encapsulating member and infrared ray incident window has an atmosphere of a mixture of a low thermal conductivity gas and oxygen.

43. The infrared detecting device according to claim 42, wherein the low thermal conductivity gas is a gas with the main ingredient of Xe, Kr or freon alone, respectively, or a mixture of said gases.

44. The infrared detecting device according to claim 43, wherein the freon gas is mainly formed of gases of the HCFC family.

45. The infrared detecting device according to claim 43, wherein the freon gas is mainly formed of gases of the $CF_3I$ family.

46. The infrared detecting device according to claim 42, wherein the low thermal conductivity gas is contained in said space with the gaseous pressure thereof kept below atmospheric pressure.

47. The infrared detecting device according to claim 42, wherein an absorbent is provided for absorbing the gas degassed inside said space.

48. The infrared detecting device of claim 38,
wherein each infrared segment includes a first electrode and a second electrode,
said first electrode is disposed on one surface of said pyroelectric material,
said second electrode is disposed on the other surface of said pyroelectric material,
said second electrode is the same shape as said first electrode in a top view, and
said first electrode and said second electrode are disposed at the opposite place via said pyroelectric material.

49. An infrared detecting device comprising:
a mounting base having a lead electrode;
an infrared detector element having a pyroelectric material and a pair of infrared detecting segments, each of said pair of infrared detecting segments being close to trapezoidal or triangular in shape, respectively, each infrared segment being disposed on said pyroelectric material mounted on said mounting base in such a way that (i) an upper side of one of the close to trapezoidal shapes is aligned in the same direction as a lower side of the other close to trapezoidal shape or (ii) a longer side of one of the close to triangular shapes is opposing to the longer side of the other close to triangular shape, each infrared detecting segment being electrically connected in such a way that each infrared detecting segment is opposite to each other in polarity;
a cylindrical encapsulating member provided in such a way as surrounding at least said infrared detector element; and
an infrared ray incident window lens array including a plurality of diffraction type optical elements which have said infrared detector, said infrared detector being provided in such a way as covering an opening of said encapsulating member and a distance corresponding to a focal length.

50. The infrared detecting device according to claim 49, wherein said each respective diffraction type optical element has close to an oval asperity pattern and the center of each respective oval figure is shifted gradually in one of the directions along the longer axis of the oval figure as the diffraction type optical element shifts outward in position.

51. The infrared detecting device according to claim 49, wherein said asperity pattern of each respective diffraction type optical element shows a cross section of a step-wise configuration with "m" steps and the maximum depth of said asperity pattern is expressed by an equation of [(m−1)/m]×[λ/(n−1)], where "λ" is the wavelength of an incident infrared ray and "n" is the refractive index of said diffraction type optical element.

52. The infrared detecting device according to claim 49, wherein said lens array has a refractive index of 3 or larger, said lens array is formed of a first material containing at least one of Si and Ge, a second material containing at least one of Ga and In, and a third s material containing at least one of As and P.

53. The infrared detecting device according to claim 49, wherein the space surrounded by said mounting base, encapsulating member and infrared ray incident window has an atmosphere of a mixture of a low conductivity gas and oxygen.

54. The infrared detecting device of claim 49,
wherein each infrared segment includes a first electrode and a second electrode,
said first electrode is disposed on one surface of a pyroelectric material,
said second electrode is disposed on the other surface of said pyroelectric material,
said second electrode is the same shape as said first electrode in a top view, and
said first electrode and said second electrode are disposed at the opposite place via said pyroelectric material.

55. An infrared detector element comprising:
(a) a pyroelectric material,
(b) a pair of first electrodes,
said pair of first electrodes being disposed on an upper side of said pyroelectric material,
said first electrodes having a first positive polarity region and a first negative polarity region,
said first positive polarity region and said first negative polarity region being electrically connected to each other, and
(c) a pair second electrodes,
said pair of second electrodes being disposed on a lower side of said pyroelectric material, said second electrodes having a second positive polarity region and a second negative polarity region, said second positive polarity region and said second negative polarity region being electrically connected to each other, wherein said pair of first electrodes and said pair of second electrodes providing a function of acting as an infrared ray absorbing film, said pair of first electrodes and said pair of second electrodes are of the same shape in a top view, and said pair of first electrodes and said pair of second electrodes are disposed at the opposite place via said pyroelectric material.

56. The infrared detector element of claim 55, wherein each of said pair-of first electrodes has a close to trapezoidal shape in a top view, said pair of second electrodes has a close to trapezoidal shape in a top view.

57. The infrared detector element of claim 55, wherein each of said pair of first electrodes has a close to trapezoidal shape in a top view, each of said close to trapezoidal shape having a long side and a short side, and the long side of one first electrode and the short side of another first electrode of said pair of first electrodes are placed on the same side of said pyroelectric material.

* * * * *